G. WEBER.
PROCESS FOR MANUFACTURING BUTT HINGES.
APPLICATION FILED NOV. 4, 1908.
919,504.
Patented Apr. 27, 1909.
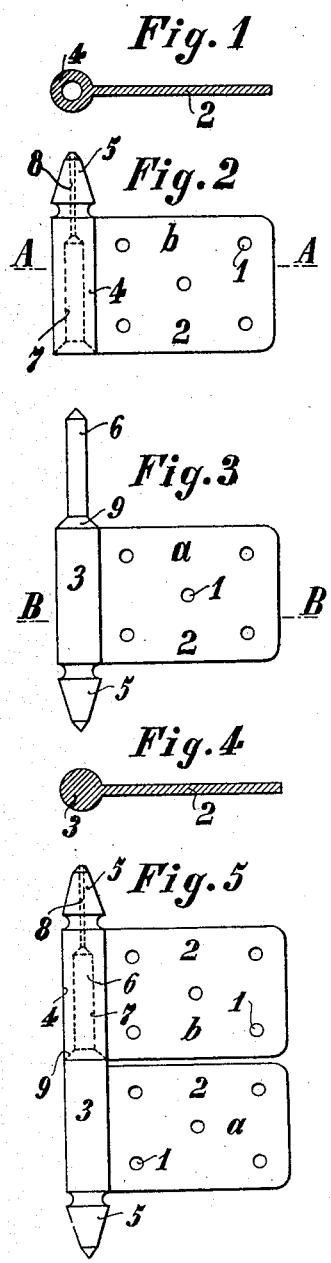
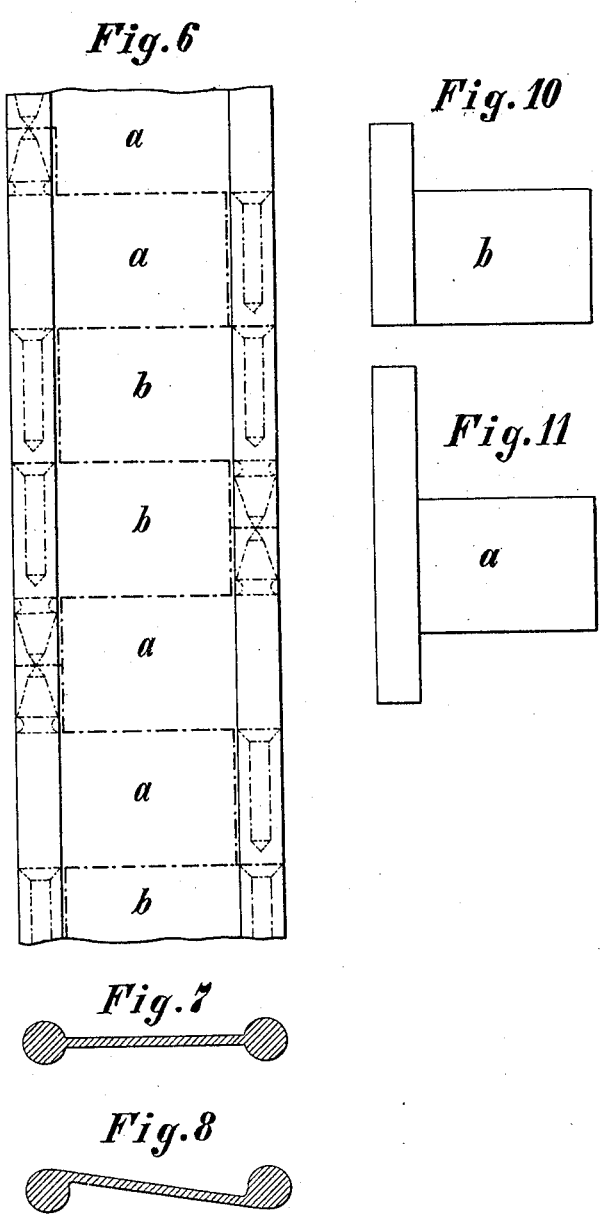
Witnesses:
Inventor:
Gustav Weber

UNITED STATES PATENT OFFICE.

GUSTAV WEBER, OF HAGEN, GERMANY.

PROCESS FOR MANUFACTURING BUTT-HINGES.

No. 919,504.   Specification of Letters Patent.   Patented April 27, 1909.

Application filed November 4, 1908.   Serial No. 461,011.

*To all whom it may concern:*

Be it known that I, GUSTAV WEBER, a citizen of the German Empire, residing at Hagen, in the Province of Westphalia and Kingdom of Prussia, Germany, have invented certain new and useful Improvements in Processes for Manufacturing Butt-Hinges; and I do hereby declare the following to be a full, clear, and exact description of the invention, such as will enable others skilled in the art to which it appertains to make and use the same.

This invention relates to a new process for manufacturing butt-hinges.
In the case of the ordinary butt-hinges on the market, the two leaves are turned over at their ends to form sockets into which the pivot-pins are fastened by rivets or by similar means. These hinges are defective in various well known ways through being composed of several parts. By making each hinge-half form a single piece the hinges are free from the defects alluded to above.

Now the present invention consists in a new process for manufacturing butt-hinges from rolled-iron with as little waste material as possible.

The new process will now be described with reference to the accompanying drawings, in which:—

Figure 1 is a section on the line A—A of Fig. 2. Figs. 2 and 3 front elevations of the upper and lower halves respectively of one form of hinge made by the new process.
Fig. 4 a section on the line B—B of Fig. 3, Fig. 5 a front elevation of a second form of hinge made by the new process, and Fig. 6 a plan of a rolled iron blank with thick dotted lines indicating the manner in which the same is to be cut, and with thin dotted lines indicating the finished halves to be formed from the blank. Figs. 7, 8 and 9 are transverse sections of three different forms of rolled iron blanks, all of which have substantially the plan shown in Fig. 6. Figs. 10 and 11 represent detail plan views of blanks hereinafter described.

In order to carry out this process rolled iron is employed which, as shown in Figs. 6–9 possesses a flat web having a thickness equal to that of the leaves of the butt-hinges to be manufactured and provided along its longitudinal edges with round reinforcing beads. Similarly shaped bars have, of course, hitherto been employed for the manufacture of hinges. These hinges, however, were of another kind, namely knob-hinges or hook-hinges provided with firmly riveted turning-pins, and further in the old process one of the edge beads was always hammered flat for the purpose of forming the hinge-leaves. In contradistinction to this according to the present invention, the leaves of the hinge halves are formed from the web situated between the round beads on the rolled iron blank and accordingly this web is made of a width equal to that of the hinge-leaves. The round beads serve in the case of the new process only for forming the hinge-knobs, the turning-pins, and the sockets for the latter, and they are situated according as it is desired to manufacture butt-hinges having hinge-leaves both in a plane passing through the center of the turning-pin, or both at the same side of the pin, or one at one side and one at the other side of the pin, either with their axes in the central plane of the web (Fig. 7) or both at one side of the web (Fig. 9) or the one at one side and the other at the other side (Fig. 8).

In order to make the hinge illustrated in Figs. 1 to 4, the rolled-iron blank is cut up in the manner indicated by the thick dotted lines in Fig. 6, that is, the web for forming the leaves of the hinge-halves is cut through transversely, the distance between the cuts being equal to the height of the leaves and between these transverse cuts longitudinal cuts are made alternately between the web and the bead at one side, and the web and the bead at the other side, the beads being cut through in such a manner that in the first place two blanks are provided for forming two upper hinge-halves with projections for enabling the knobs to be formed by turning (Fig. 10) and that then two blanks for two lower hinge-halves (Fig. 11) are provided, one portion of the round bead serving for forming the turning-pin and another portion for the knob. In order to obtain the finished hinge-halves it is only necessary to turn down the projections to form the knobs and to form the turning-pin socket in the upper hinge-half by boring and the turning-pin on the lower hinge-half by turning. This work can be readily performed by suitably constructed automatic machines.

The waste of material is very slight, the only material wasted being due to turning and boring operations performed on the blanks (Figs. 10 and 11). By cutting up the rolled-iron as described, waste is almost completely avoided. The butt-hinges (Figs. 1-4) produced by this process consequently are not higher in price than others. They are, however, materially better. For since in the case of the hinges made by the new process, the plates 2 provided with the screw-holes 1 form one single piece together with the lateral beads or knuckles 3 and 4, the knobs 5 and the turning-pin 6, it is of course impossible for the pin and so on to become loose. The strength and durability of the new hinges is consequently very much greater than is the case with ordinary hinges. The hole in the upper hinge-half for the reception of the turning-pin may be continued up to almost the knob of the upper half so that with a hinge-leaf of given width the two halves have a longer bearing than would otherwise be possible. In that case the knob on the upper half may be provided with a passage 8 opening into the hole 7 for the reception of the turning-pin, so that at any time it is possible conveniently to lubricate the hinge through this passage without unhinging the door. Finally this process permits the turning-pin 6 and the hole 7 for the reception of the latter to be so shaped that the upper hinge-half and consequently the door not only rests on the upper end of the pin but is also provided with a bearing 9 at the lower end of the pin, which bearing is suitably conical, as is evident from Figs. 3 and 4 and Fig. 5. By this increase of the bearing surface too rapid wear and consequently sinking of the door is prevented. In the case of this process the butt-hinge may without any trouble also be so shaped that the round bead on the lower hinge-half for a short distance above the leaf is not reduced in size when the pin is formed by turning, so that as is evident from Fig. 5, a space is left between the leaves of the two halves.

What I claim as my invention and desire to secure by Letters Patent is:—

The process for manufacturing butt-hinges from rolled-iron comprising a web provided with lateral round beads, said process consisting in cutting the web transversely, the distance between the cuts being equal to the width of the hinge-leaves to be produced and in cutting the web longitudinally between the transverse cuts alternately between the web and the bead at one side, and the web and the bead at the other side, and in cutting the beads through in such a manner that in the first place two blanks are provided for forming two upper hinge-halves with projections for enabling the knobs to be formed by turning, and that then two blanks for the lower hinge-halves are provided, one portion of the round bead serving for forming the turning-pin and another portion for the knob.

In testimony whereof, I have signed my name to this specification in the presence of two subscribing witnesses.

GUSTAV WEBER.

Witnesses:
OTTO KÖNIG.
WALTER HULSKAMP.